Figure 1:
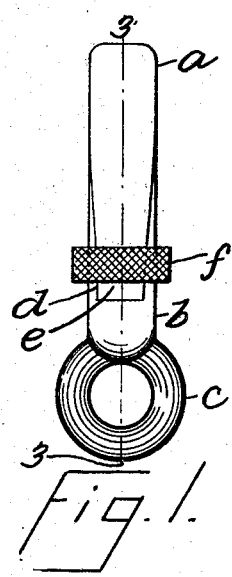

No. 782,603. PATENTED FEB. 14, 1905.
F. DRONNE.
SAFETY HOOK.
APPLICATION FILED OCT. 18, 1904.

WITNESSES
J. C. Larsen
F. A. Stewart

INVENTOR
François Dronne
BY Edgar Tate & Co.
ATTORNEYS.

No. 782,603. Patented February 14, 1905.

UNITED STATES PATENT OFFICE.

FRANÇOIS DRONNE, OF ANNADALE, NEW YORK.

SAFETY-HOOK.

SPECIFICATION forming part of Letters Patent No. 782,603, dated February 14, 1905.

Application filed October 18, 1904. Serial No. 228,934.

*To all whom it may concern:*

Be it known that I, FRANÇOIS DRONNE, a citizen of the United States, residing at Annadale, in the county of Richmond and State of New York, have invented certain new and useful Improvements in Safety-Hooks, of which the following is a specification such as will enable those skilled in the art to which it appertains to make and use the same.

The object of this invention is to provide an improved safety spring-hook for use in connection with harness of various kinds and classes, and also in connection with dog-collars or chains and for various other and similar purposes.

The invention is fully disclosed in the following specification, of which the accompanying drawings form a part, in which the separate parts of my improvement are designated by suitable reference characters in each of the views, and in which—

Figure 2:
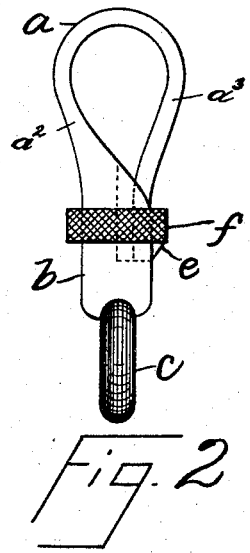

Figure 1 is a front view of my improved safety-hook and showing the hook closed; Fig. 2, a side view at right angles to Fig. 1, and Fig. 3 a section on the line 3 3 of Fig. 1 and showing the hook open.

In the practice of my invention I provide a spring-hook $a$, composed of any desired metal and consisting of two side members $a^2$ and $a^3$, the latter of which is resilient. The side member $a^2$ at the end thereof is projected and formed into a cylindrical shank or body portion $b$, which is longer than the resilient side member $a^3$ of the hook and which is provided at its end with a ring or eye $c$, the plane of which is at right angles to that of the hook in the form of construction shown. The cylindrical body or shank portion $b$, which is connected with the side $a^2$ of the hook, is provided in the side thereof which faces the end of the resilient side member $a^3$ of the hook with a longitudinal recess $d$, adapted to receive the free end of said resilient side member of the hook, and said end of the side member $a^3$ of the hook is provided with an outwardly-directed lug or projection $e$, also adapted to enter the recess $d$, and the recess $d$ is of such depth as to receive the said end of the resilient side member $a^3$ of the hook, together with the lug or projection $e$.

Figure 3:
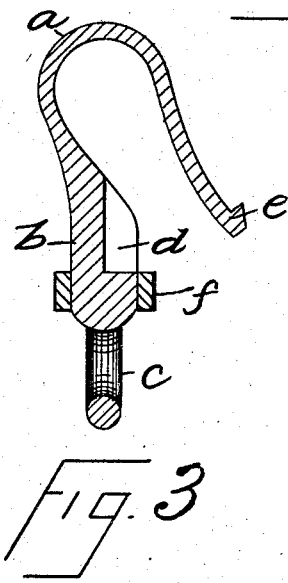

Mounted on the cylindrical shank or body portion $b$ of the side member $a^2$ of the hook is a collar or band $f$, which is free to slide on said cylindrical shank or body portion $b$ and to be moved longitudinally thereof, and when the hook is not in use the collar or band $f$ rests in a position adjacent to the ring or eye $c$, as shown in Fig. 3, and when it is desired to use the hook or to lock the resilient side member $a^3$ for use the said resilient side member is pressed down so that the end thereof and the lug or projection $e$ will be received by the recess $d$, and the collar or band $f$ is moved over the said end of the resilient side member $a^3$ of the hook into the position shown in Figs. 1 and 2, and said collar or band $f$ is engaged by the lug or projection $e$, and the hook is locked in the closed position, the resilient side member $a^3$ springing outwardly, as shown in Fig. 2, so that the lug or projection $e$ will engage the band $f$. In order to open the hook, the resilient side member is forced inwardly and the collar or band $f$ moved outwardly in the direction of the ring or eye $c$, this position of the parts being shown in Fig. 3.

In the construction shown the hook member $a$ is loop-shaped or U-shaped in form; but said hook member may be of any desired shape, and all the parts of this device may be made of any preferred dimensions, and may therefore be made of any desired strength.

Having fully described my invention, what I claim as new, and desire to secure by Letters Patent, is—

A safety spring-hook one side of which is resilient and the other side of which is projected and formed into a cylindrical shank or body portion having a ring or eye at the end thereof, said shank or body portion being provided in the side adjacent to the resilient side member of the hook with a longitudinal recess adapted to receive the end of the resilient side member, said end of the resilient side member being provided with an outwardly-directed lug or projection, and the depth of said recess being sufficient to receive the said end of the resilient side member and said lug or projection, and a collar or band mounted on said body portion and movable longitudinally thereof and adapted to cover the end of the resilient side member when the latter is depressed into said recess and to engage said lug or projection, substantially as shown and described.

In testimony that I claim the foregoing as my invention I have signed my name, in presence of the subscribing witnesses, this 11th day of October, 1904.

FRANÇOIS DRONNE.

Witnesses:
   JOHN STUBER,
   WILLIAM THOMSON.